(12) United States Patent
Grabs

(10) Patent No.: US 11,190,123 B2
(45) Date of Patent: Nov. 30, 2021

(54) METHOD FOR OPERATING AN ELECTRIC MACHINE, DEVICE, DRIVE DEVICE, AND MOTOR VEHICLE

(71) Applicant: Robert Bosch GmbH, Stuttgart (DE)

(72) Inventor: Manfred Grabs, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 24 days.

(21) Appl. No.: 16/637,827

(22) PCT Filed: Jul. 31, 2018

(86) PCT No.: PCT/EP2018/070741
§ 371 (c)(1),
(2) Date: Feb. 10, 2020

(87) PCT Pub. No.: WO2019/030056
PCT Pub. Date: Feb. 14, 2019

(65) Prior Publication Data
US 2020/0169206 A1   May 28, 2020

(30) Foreign Application Priority Data

Aug. 11, 2017 (DE) ...................... 10 2017 214 074.7

(51) Int. Cl.
*H02P 1/46* (2006.01)
*H02P 23/04* (2006.01)
*B60L 15/20* (2006.01)

(52) U.S. Cl.
CPC .......... *H02P 23/04* (2013.01); *B60L 15/2009* (2013.01); *B60L 2240/421* (2013.01); *B60L 2240/423* (2013.01)

(58) Field of Classification Search
CPC ................. H02P 23/04; B60L 15/2009; B60L 2240/421; B60L 2240/423; B60L 2240/461
See application file for complete search history.

(56) References Cited

U.S. PATENT DOCUMENTS

| | | | |
|---|---|---|---|
| 7,418,364 B1* | 8/2008 | Horton ................... | G01C 21/16 702/151 |
| 2003/0177846 A1 | 9/2003 | Tamagawa et al. | |
| 2011/0178662 A1 | 7/2011 | Sime et al. | |
| 2014/0336885 A1 | 11/2014 | Bang et al. | |

FOREIGN PATENT DOCUMENTS

EP    3031662    6/2016

OTHER PUBLICATIONS

International Search Report for Application No. PCT/EP2018/070741 dated Oct. 18, 2018 (English Translation, 2 pages).

* cited by examiner

*Primary Examiner* — Karen Masih
(74) *Attorney, Agent, or Firm* — Michael Best & Friedrich LLP

(57) ABSTRACT

A method for operating an electric machine for a vehicle. A target torque of the electric machine is regulated during a driving process depending on a detected time-dependent rotational speed of the electric machine. In the process, the detected rotational speed is differentiated by means of a first high-pass filter over time, the detected rotational speed is then differentiated again over time in a limited manner to positive rotational speed values and using a second high-pass filter, and the target torque is regulated depending on the output value of the second high-pass filter.

9 Claims, 2 Drawing Sheets

METHOD FOR OPERATING AN ELECTRIC MACHINE, DEVICE, DRIVE DEVICE, AND MOTOR VEHICLE

BACKGROUND OF THE INVENTION

The invention relates to a method for operating an electric machine of a vehicle, wherein a target torque of the electric machine is regulated during a driving event on the basis of a detected, time-dependent rotational speed of the electric machine.

Further, the invention relates to an apparatus for operating the electric machine, a drive device for a vehicle, and a vehicle.

Methods of the type specified at the outset are known from the prior art. Thus, electric machines are used in vehicles for the purposes of producing a positive and/or negative drive torque in order to drive the vehicle or assist a drive of the vehicle. Here, the rotational speed behavior of the electric machine is of particular importance, particularly if the electric machine is provided as the only drive machine. Thus, variations in the rotational speed may lead to variations in the drive torque, for example to "jerking", i.e., accelerations and decelerations in the direction of travel of the vehicle. To reduce or dampen variations in the rotational speed, it is known practice to detect the current rotational speed and, e.g., filter the latter one or more times by means of a filter, more particularly differentiate said rotational speed with respect to time one or more times, and take this into account when prescribing the target torque in order to improve the rotational speed behavior (rotational speed control). Then, a damping torque is added to the target torque on the basis of the rotational speed for the purposes of regulating the target torque, the damping torque being subtracted from the target torque or added to the target torque. In particular, this control reduces or damps variations in the rotational speed and/or the drive torque during a driving event on a poor surface. Here, a "poor surface" means a lane that has at least one instance, more particularly many instances, of unevenness and/or of a change in friction. The practice of detecting a wheel rotational speed of at least one driven wheel of the vehicle for the purposes of influencing the torque or regulating the rotational speed is also known. Here, in particular, the detected rotational speed is subtracted from the detected wheel rotational speed in order to determine the damping torque. In particular, this control reduces or minimizes vibrations of a drivetrain of the vehicle, particularly in the case of braking events.

SUMMARY OF THE INVENTION

According to the invention, provision is made for the detected rotational speed to be differentiated with respect to time by a first high-pass filter, subsequently be restricted to positive rotational speed values and once again be differentiated with respect to time by a second high-pass filter, wherein the target torque is regulated on the basis of the output value of the second high-pass filter. The advantage herein lies in the fact that a production of a suddenly occurring torque, in particular an accelerating torque, for example as a consequence of an electric discharge of a storage element or a capacitor, for example of one of the high-pass filters or filters, is effectively prevented during a braking event or an emergency stop. This increases driving safety because unwanted torques, more particularly accelerating torques, are minimized during an emergency stop. In particular, a change in rotational speed over time, more particularly a gradient of the rotational speed, is ascertained by the first derivative of the rotational speed with respect to time. By way of example, the gradient is formed by at least two successive rotational speeds within a predeterminable period of time. The subsequent restriction to positive values means that negative gradients of the rotational speeds or gradients with a negative slope are removed by filtering. Consequently, the gradients are limited to positive values only. Subsequently, the positive gradients are differentiated with respect to time. This produces a constant output signal, which is limited to positive values, of the second high-pass filter, said output signal being used to regulate the target torque.

According to a preferred development of the invention, provision is made for the detected rotational speed to be moreover differentiated with respect to time by a third high-pass filter and for the rotational speed differentiated with respect to time by the third high-pass filter to be integrated with respect to time by a first low-pass filter, wherein the target torque is regulated on the basis of the output values of the second high-pass filter and of the first low-pass filter. The advantage here lies in the fact that, in addition to the prevention of the production of the unwanted accelerating torque, an improved damping of the rotational speed and/or of the target torque is ensured, particularly during the braking event or the emergency stop of the vehicle. In particular, this leads to an improvement in the driving comfort because jerky movements are reduced or damped, particularly during the braking event. Here, at least one gradient of the rotational speed or of a rotational speed curve is ascertained or the rotational speed is filtered by means of the third high-pass filter for the purposes of regulating or damping the rotational speed and/or the target torque. The gradient or the filtered rotational speed are supplied to the first low-pass filter. Then, the first low-pass filter integrates the ascertained gradient with respect to time in such a way that the detected rotational speed or, alternatively, a rotational speed deviating from the detected rotational speed is determined. Here, in particular, the deviating rotational speed is a rotational speed or a rotational speed curve from which the rotational speed variation has been removed by filtering. Preferably, the first low-pass filter for integrating the rotational speed or the rotational speed curve to form a deviating rotational speed or a deviating rotational speed curve is operated with a shorter time constant than the third high-pass filter.

Preferably, provision is made for the output values of the third high-pass filter and of the first low-pass filter to be compared to one another and for the result of the comparison to be fed to the first low-pass filter as a controlled variable. The advantage here lies in the fact that dynamic and fast control of the target torque is ensured. If the output value of the third high-pass filter, i.e., the filtered rotational speed, is greater than the output value of the first low-pass filter, i.e., greater than the rotational speed ascertained by integration with respect to time, the low-pass filter immediately tracks the output value or an output signal of the third high-pass filter, i.e., without a time delay. Consequently, the output value or the output signal of the third high-pass filter is directly integrated again by the first low-pass filter. The rotational speed ascertained in the process by the integration then at least substantially corresponds to the rotational speed filtered by the third high-pass filter. If the output value of the third high-pass filter is less than the output value of the first high-pass filter, the output value of the third high-pass filter is supplied to the first low-pass filter; however, the first low-pass filter is then operated with a predeterminable time constant, which is preferably smaller than a time constant with which the third high-pass filter is operated. The rotational speed ascertained in the process by the integration with respect to time preferably deviates from the filtered rotational speed of the third high-pass filter, and so there can be effective regulating or damping of the target torque.

Preferably, provision is made for the rotational speed integrated with respect to time by the first low-pass filter to be integrated with respect to time by a second low-pass filter, wherein the second low-pass filter has an inverted embodiment with respect to the first low-pass filter and wherein the output value of one of the low-pass filters is subtracted from the output value of the other low-pass filter and wherein the target torque is regulated on the basis of the output values of the second high-pass filter and of the value obtained by the subtraction. The advantage here lies in the fact that the damping of the rotational speed and/or of the target torque is additionally improved, particularly during the braking event. Here, "inverted" means that the second low-pass filter immediately tracks the output value or the output signal of the first low-pass filter if the output value of the first low-pass filter is less than the output value of the second low-pass filter. If the output value of the first low-pass filter is greater than the output value of the second low-pass filter, the output value of the first high-pass filter is supplied to the second low-pass filter; however, the second low-pass filter then is operated with a predeterminable time constant, which is preferably smaller than the time constant of the first low-pass filter. This ensures that the output value or the output signal of the second low-pass filter and the output value or the output signal of the first low-pass filter can be combined by calculation, more particularly added to one another or subtracted from one another. Due to this, the resultant damping torque is made more precise, and so the target torque can be regulated more accurately.

Preferably, provision is made for a mean value to be calculated from the output value or a plurality of output values of the second low-pass filter, wherein the target torque is regulated on the basis of the mean value. The advantage here lies in the fact that the control of the rotational speed and/or of the target torque is improved once again, particularly during the braking event or the emergency stop. In particular, the calculated mean value facilitates a particularly fast determination as to whether a critical or a non-critical damping torque is realized by the mean value. Here, "critical" means that a user of the vehicle perceives disturbing vibrations, for example in a chassis or a steering wheel of the vehicle, during the braking event as a consequence of the target torque regulated by the calculated mean value. Preferably, the calculated mean value is compared to a predeterminable mean value. The critical damping torque is identified if the deviation between the calculated mean value and the predeterminable mean value is greater than a predeterminable limit. Preferably, the predeterminable mean value corresponds to a damping torque or damping which does not produce any disturbing vibrations during the braking event and hence realizes a uniform braking event, in particular. By way of example, the predeterminable mean value equals zero.

Preferably, the calculated mean value is amplified for the purposes of regulating the target torque. The advantage here lies in the fact that the calculated mean value can be matched to the predetermined mean value. In particular, this allows the calculated mean value to be increased or decreased in such a way that the deviation becomes less than or equal to the predeterminable limit value. Hence, a non-critical damping torque is effectively realized and the braking behavior of the vehicle during a braking event is optimized. The addition of the gain value is implemented, for example, by means of a multiplication by a predeterminable factor, more particularly a factor ranging from 0.5 to 0.75. For amplifying the calculated mean value, a predeterminable gain value or the predeterminable factor is preferably added to said calculated mean value, particularly by means of an amplifier or an amplifier device. The amplifier is preferably embodied to match the mean value calculated from the output signals of the second low-pass filter to the predetermined mean value, in particular, by means of the gain value.

The apparatus for operating an electric machine of a vehicle as according to the invention is distinguished by a first high-pass filter for differentiating the detected rotational speed with respect to time, by a limiter device for restricting the rotational speed of the first high-pass filter, which was differentiated with respect to time, to positive rotational speed values, and by a second high-pass filter for differentiating the rotational speed, which was restricted to positive rotational speed values, with respect to time, wherein the control device regulates the target torque on the basis of the output value of the second high-pass filter. The first and the second high-pass filter are preferably embodied as differential members or differentiating members with a first-order, second-order or higher order lag. As a result of this, the advantages already mentioned above arise. Further advantages and preferred features emerge, in particular, from what was described above and from the claims.

Preferably, provision is made for the apparatus to comprise a third high-pass filter for differentiating the detected rotational speed with respect to time and a first low-pass filter for integrating the output value of the third high-pass filter with respect to time, wherein the control device regulates the target torque on the basis of the output values of the second high-pass filter and of the first high-pass filter. The aforementioned advantages arise here. Further advantages and preferred features emerge, in particular, from what was described above and from the claims.

The drive device for a vehicle, comprising an electric machine and an apparatus for operating an electric machine, is distinguished by virtue of the apparatus being embodied to carry out the method as claimed in any one of the preceding claims when used as intended. As a result of this, the advantages already mentioned above arise. Further advantages and preferred features emerge, in particular, from what was described above and from the claims.

The motor vehicle according to the inventions distinguished by a drive device according to the invention. As a result of this, the advantages already mentioned above arise. Further advantages and preferred features emerge, in particular, from what was described above and from the claims.

BRIEF DESCRIPTION OF THE DRAWINGS

The invention is intended to be explained in more detail below on the basis of the drawings. In this respect.

DETAILED DESCRIPTION

Figure 1:
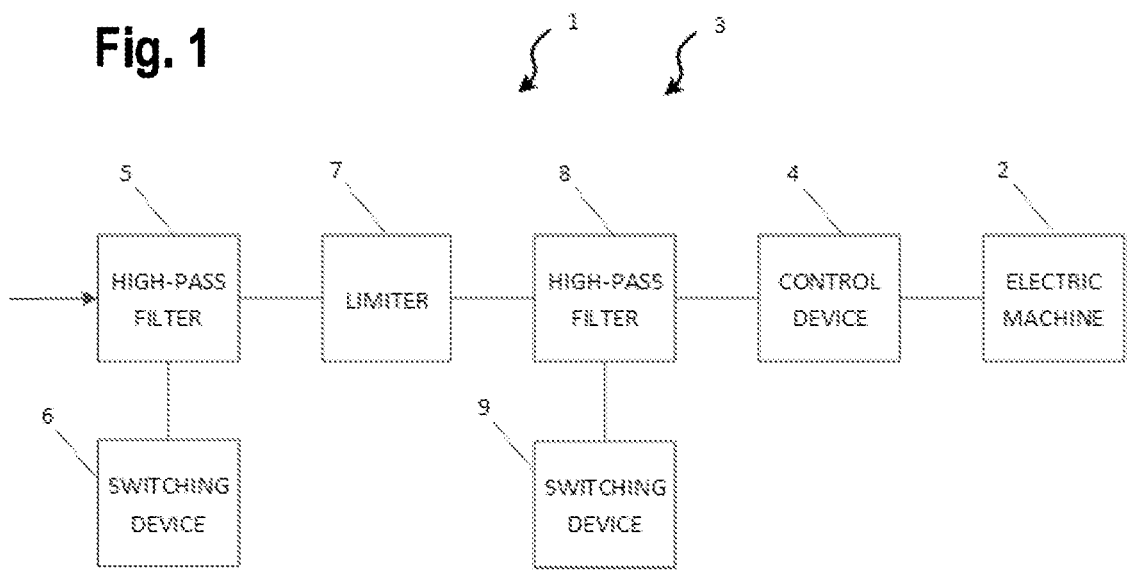
FIG. 1 shows an apparatus for operating an electric machine for a vehicle, as per a first exemplary embodiment.

In a simplified illustration, FIG. 1 shows an apparatus 1 for operating an electric machine 2, for example a DC or AC machine, of a vehicle 3, the latter not being illustrated here. The apparatus 1 comprises a control device 4 for regulating a target torque of the electric machine 2 on the basis of a detected, time-dependent rotational speed of the electric machine 2, in particular the rotational speed of a drive shaft of the electric machine 2, during a driving event. Optionally, a plurality of rotational speeds or a temporal rotational speed curve are/is detected.

The rotational speed or the rotational speed of the drive shaft is preferably detected by means of a sensor, more particularly a rotational speed sensor.

The apparatus 1 furthermore comprises a first high-pass filter 5 for differentiating the detected rotational speed with respect to time. The detected rotational speed or a rotational speed curve consisting of at least two rotational speeds and, by way of a switching device 6 connected to the high-pass filter 5, a time constant $T_1$ are supplied to the high-pass filter 5 as an input signal. In the present case, the first high-pass filter 5 is embodied as a differentiating member with a first-order lag, in particular as a DT1 member.

A first differentiation of the rotational speed with respect to time is carried out by the first high-pass filter 5 for the purposes of ascertaining a change in rotational speed over time, in particular a gradient of the rotational speed. By way of example, the gradient is formed by at least two successive rotational speeds within a predeterminable period of time. Optionally or additionally, a plurality of rotational speeds or a temporal rotational speed curve is/are differentiated with respect to time.

Furthermore, the apparatus 1 comprises a limiter device 7 for restricting the rotational speed, which was differentiated with respect to time by the first high-pass filter 5, to positive rotational speed values. The rotational speed, which was differentiated with respect to time by the first high-pass filter 5, is supplied to the limiter device 7 as input signal. The limiter device 7 limits the rotational speed, which was differentiated with respect to time, to gradients with a positive slope. This means that negative gradients or gradients with a negative slope are removed by filtering by the limiter device 7.

Additionally, the apparatus 1 comprises a second high-pass filter 8 for differentiating the rotational speed, which was restricted to positive rotational speed values, with respect to time, said second high-pass filter preferably having an analogous embodiment to the first high-pass filter 5. The output signal of the limiter device 7 and, by way of a further switching device 9, a time constant $T_2$ are supplied to the second high-pass filter 8 as input signals. Preferably, $T_1$ equals $T_2$. The positive gradients are differentiated with respect to time by the second high-pass filter 8. As a result, a positive output signal, in particular constant, positive output signal, of the second high-pass filter 8 is produced. Depending on the output signal of the second high-pass filter 8, a damping torque is preferably supplied for the purposes of regulating the target torque of the control device 4, wherein the control device 4 regulates the target torque on the basis of the output value of the second high-pass filter 8, in particular on the basis of the damping torque. Preferably, the output value of the second high-pass filter 8 or the damping torque is added to the target torque.

The advantage arising here is that, in the case of a braking event of the vehicle 3 in particular, more particularly during said braking event of the vehicle, an accelerating torque is minimized, or the production thereof is at least substantially prevented.

Figure 2:
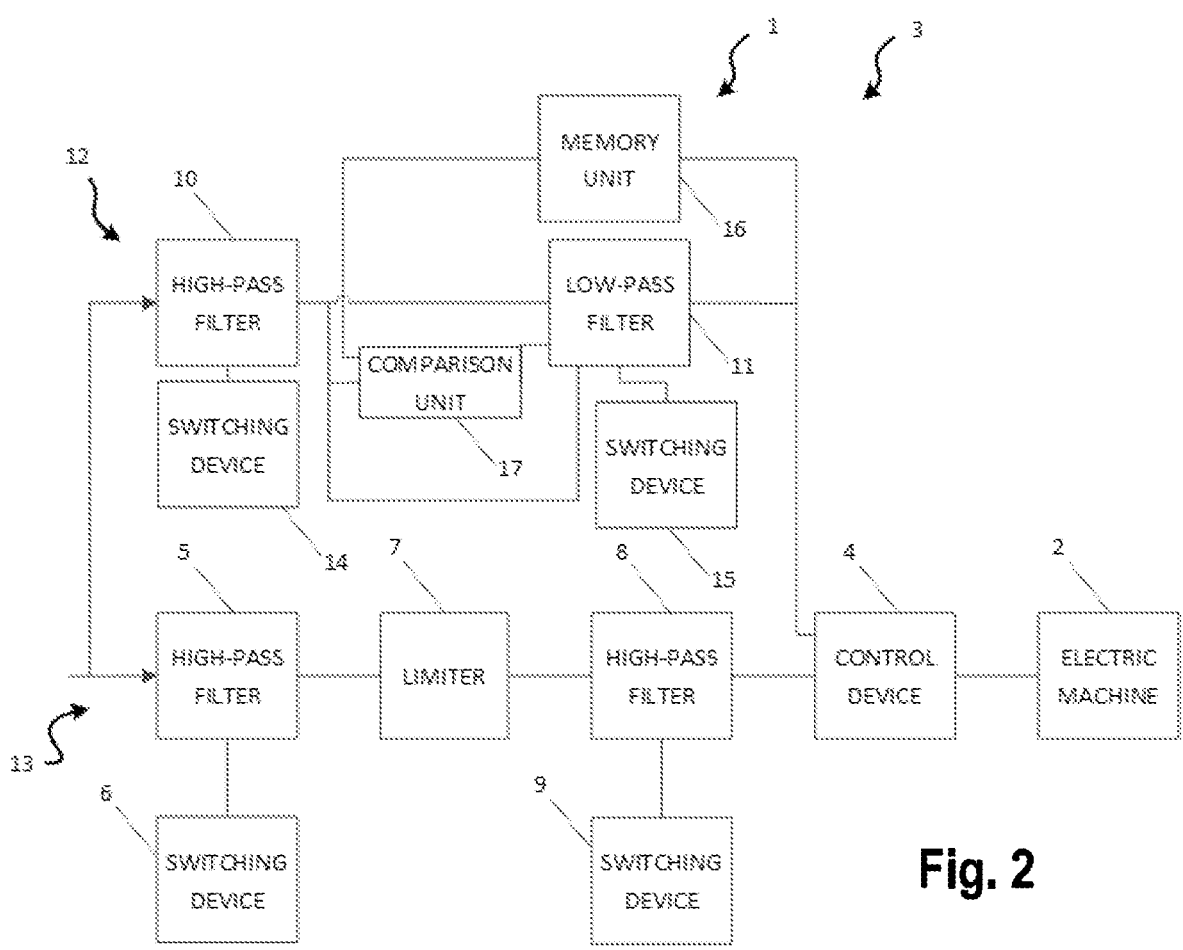
FIG. 2 shows the apparatus as per a second exemplary embodiment.

FIG. 2 shows the apparatus 1 as per a second exemplary embodiment. In addition to the features known from FIG. 1, the apparatus as per FIG. 2 additionally comprises a third high-pass filter 10 for differentiating the detected rotational speed with respect to time and a first low-pass filter 11 for integrating the output value of the third high-pass filter 10 with respect to time.

Here, the control device 4 regulates the target torque on the basis of the output values of the second high-pass filter 8 and of the first low-pass filter 11. A damping torque for regulating the target torque consequently emerges from the output value of the second high-pass filter 8 and of the first low-pass filter 11 in this case. Here, the third high-pass filter 10 and the first low-pass filter 11 form a parallel branch 12 to the control branch 13, which comprises the first high-pass filter 5 and the second high-pass filter 8.

The third high-pass filter 10 preferably has an analogous embodiment to the first high-pass filter 5 and said third high-pass filter is connected to a switching device 14 which supplies the third high-pass filter 10 with a time constant $T_3$. The first low-pass filter 11 is connected to a switching device 15 which transmits a time constant $T_4$ to said low-pass filter. Preferably, the first low-pass filter 11 is embodied as an integration member, more particularly as a PT1 member.

Moreover, the first low-pass filter 11 optionally comprises a memory unit 16, which is preferably embodied to receive at least one output value of the first low-pass filter 11 and to store said at least one output value where necessary.

Preferably, provision is made for the output value of the first low-pass filter 11 to be transmitted to a comparison unit 17 of the first low-pass filter 11. Additionally, the output signal of the third high-pass filter 10 is transmitted to the comparison unit 17. The output value of the first low-pass filter 11, i.e., the filtered rotational speed, and the output value of the third high-pass filter 10, i.e., the rotational speed ascertained by the integration with respect to time, are compared to one another by the comparison unit 17, more particularly by a logic of the comparison unit 17. If the output value of the first low-pass filter 11 is less than the output value of the third high-pass filter 10, the output value of the third high-pass filter 10 is integrated directly with respect to time by the low-pass filter 11. Consequently, the first low-pass filter 11 tracks the output signal of the third high-pass filter 10 without a time lag. If the output value of the third high-pass filter 10 is less than the output value of the first low-pass filter 11, the output value of the third high-pass filter 10 is supplied to the first low-pass filter 11; however, the first low-pass filter 11 is then operated with the time constant $T_4$, wherein $T_4$ is preferably less than $T_3$. The rotational speed of the first low-pass filter 11 then ascertained by integration preferably deviates from the filtered rotational speed of the third high-pass filter 10 such that there can be effective control or damping of the target torque. Here, the deviating rotational speed is, in particular, a rotational speed from which the rotational speed variation has been removed by filtering.

In addition to preventing the production of an accelerating torque, this ensures improved damping of the rotational speed and/or of the target torque, particularly during the braking event or the emergency stop of the vehicle.

Figure 3:
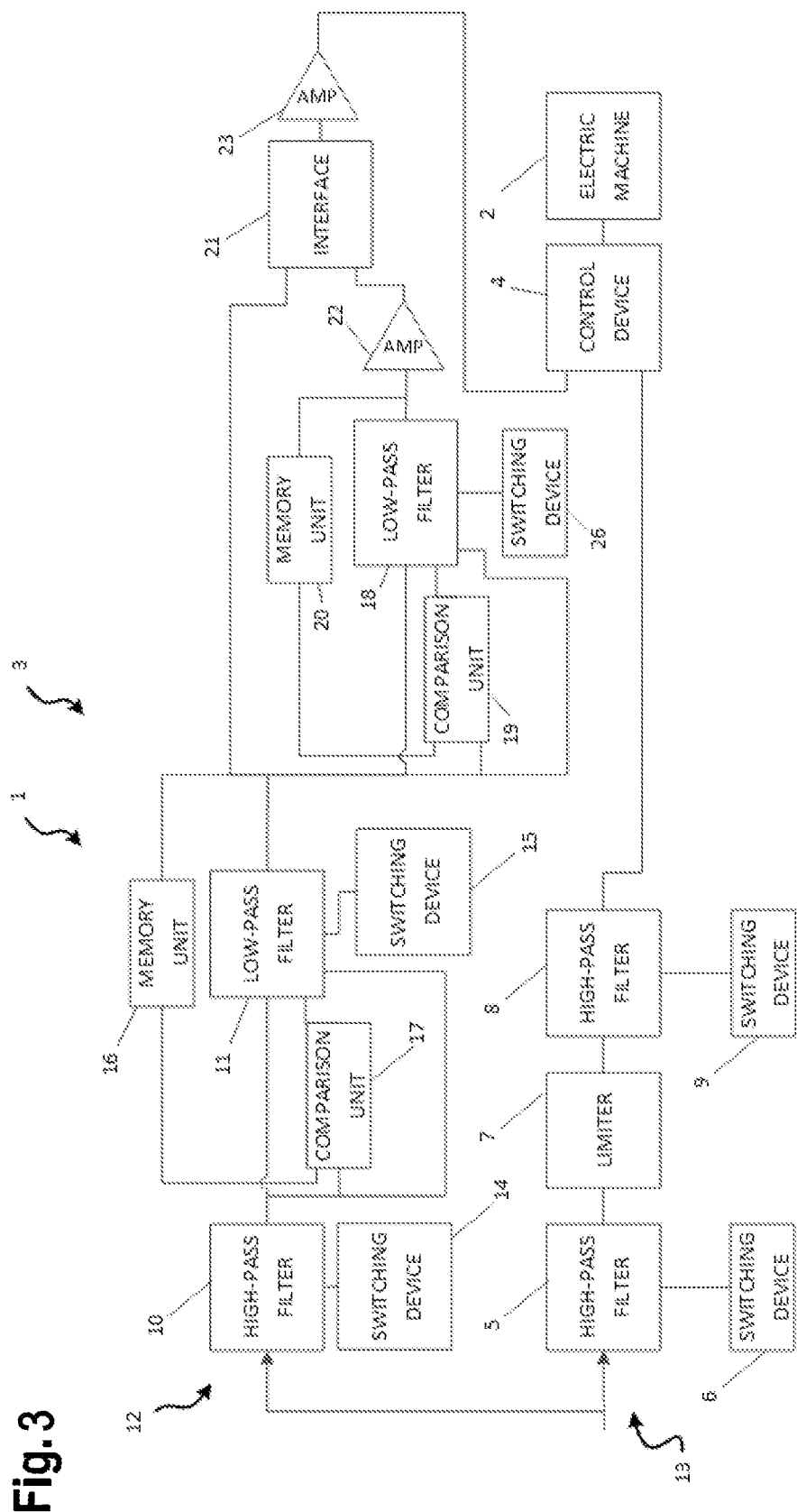
FIG. 3 shows the apparatus as per a third exemplary embodiment.

FIG. 3 shows a further configuration of the apparatus 1, wherein the apparatus now additionally comprises a second low-pass filter 18 for integrating the output value of the first low-pass filter 11 with respect to time. Preferably, the second low-pass filter 18 is embodied as a PT1 member, in a manner analogous to the first low-pass filter 11. The second low-pass filter 18 preferably comprises a comparison unit 19, wherein the output signal of the first low-pass filter 11 and/or the output signal of the second low-pass filter 18 are transmittable to said comparison unit. Moreover, the second low-pass filter 18 optionally comprises a memory unit 20. The second low-pass filter 18 has an inverted embodiment with respect to the first low-pass filter 11. Here, "inverted" means that the logic of the comparison unit 19 of the second low-pass filter 18 is inverted to the logic of the comparison unit 17 of the first low-pass filter 11. The second low-pass filter 18 is connected to a switching device 26, which transmits a time constant $T_5$ to said second low-pass filter. Preferably, $T_5$ is less than $T_4$. Additionally, provision is preferably made for $T_5$ to be greater than $T_1$.

Furthermore, the apparatus 1 comprises an interface 21, in particular for subtracting the output value of one of the low-pass filters 11, 18 from the output value of the other low-pass filter 11, 18. To this end, the output signals of the first low-pass filter 11 and of the second low-pass filter 18 are preferably transmitted to the interface 21. In the present case, the output value of the second low-pass filter 18 is subtracted from the output value of the first low-pass filter 11. The control device 4 regulates the target torque on the basis of the output values of the second high-pass filter 8 and the output value of the interface 21.

Preferably, the second low-pass filter 18 additionally comprises an amplifier device 22, in particular an actuatable amplifier device. Said amplifier device calculates a mean value from the output value of the second low-pass filter 18, the target torque being regulated on the basis of the mean value. Here, the calculated mean value is amplified for the purposes of regulating the target torque, more particularly for regulating the output value of the interface 21, in particular by adding a predeterminable gain value to the calculated mean value. The amplification or addition of the gain value is implemented, in particular, by the amplifier device 22. By the amplification or the addition of the gain value, the calculated mean value is able to be matched to a predetermined mean value, the predetermined mean value preferably corresponding to an output value or damping torque, by means of which no vibrations that disturb the driver and/or that are perceivable by the driver are produced during a braking event. In particular, the calculated mean value is considered adapted to the predetermined mean value if a deviation between the calculated mean value and the predetermined mean value is less than or equal to a predeterminable limit value. By way of example, the predeterminable mean value equals zero. The amplification or addition of the gain value is for example implemented by means of a multiplication by a factor or gain factor less than 1, more particularly a factor ranging from 0.5 to 0.75. The amplification or addition of the gain value renders it possible, in particular, to set the resultant damping torque to a zero mean value. If a factor of greater than 0.75 is chosen, it acts like motor-driven active braking by the electric machine 2, in particular. Consequently, choosing the factor to be greater than 0.75 allows the amplifier device 22 to be used for active braking assistance. As an alternative to the amplifier device 22, provision is made for a braking pressure to be used for optimizing electric braking or an electric braking event, wherein the braking pressure is preferably ascertained by a characteristic factor formation.

Moreover, the apparatus 1 preferably comprises a further amplifier device 23, in particular a further actuatable amplifier device. The further amplifier device 23 is preferably embodied to activate or deactivate the parallel branch 12. By way of example, activation is implemented by operating the amplifier device 23 with a factor or gain factor greater than or equal to 1. Optionally, at least one further amplifier device 25, not illustrated here, is additionally provided, said further amplifier device preferably being embodied to activate or deactivate the control branch 13 and/or the control device 4. Preferably, the parallel branch 12 and the control branch 13 are activated when the implementation of a braking event is identified. By way of example, for the purposes of identifying the braking event, the vehicle 3 is monitored for as to whether a brake pedal of the vehicle 3 is operated by a user of the vehicle 3. In the present case, the parallel branch 12 is formed by the third high-pass filter 10, the first low-pass filter 11 and the second low-pass filter 18.

The apparatus 1 and the method for operating the electric machine 2 for the vehicle 3, as arises from what was described above, yield the advantage that particularly advantageous damping of the target torque is ensured, both during driving events on "poor surfaces" and in the case of braking events, more particularly in the case of emergency stops. This improves a driving comfort for a user of the vehicle because jerky movements of the vehicle 3 on account of rotational speed or torque variations are minimized. Moreover, the driving safety is increased because an accelerating torque, for example as a consequence of the discharge of a capacitor of one of the high-pass filters 5, 8, 10, is minimized, particularly within the scope of an emergency stop. A further advantage arising in comparison with known damping controls is that an improved acceleration behavior and breaking behavior of the vehicle 3, and a more uniform rotational speed at a slip limit, are ensured.

Furthermore, a drive device 24, not illustrated here, for the vehicle 3 is provided, comprising the electric machine 2 and the apparatus 1 for operating the electric machine 2, wherein the apparatus 1 is embodied to carry out the method for operating the electric machine 2 when used as intended. A motor vehicle comprising the drive device 24 is likewise provided.

The invention claimed is:

1. A method for operating an electric machine (2) for a vehicle (3), wherein a target torque of the electric machine (2) is regulated during a driving event based on a detected, time-dependent rotational speed of the electric machine (2), the method comprising:
    differentiating the detected rotational speed with respect to time by a first high-pass filter (5);
    subsequently restricting the differentiated rotational speed to only rotational speed values of positive slope gradients; and
    differentiating the restricted differentiated rotational speed with respect to time by a second high-pass filter (8);
    differentiating the detected rotational speed with respect to time by a third high-pass filter (10);
    integrating the rotational speed differentiated by the third high-pass filter (10) with respect to time by a first low-pass filter (11); and
    regulating the target torque based on an output value of the second high-pass filter (8) and an output value of the first low-pass filter (11).

2. The method as claimed in claim 1, wherein the output values of the third high-pass filter (10) and of the first low-pass filter (11) are compared to one another and fed to the first low-pass filter (11) as a controlled variable.

3. The method as claimed in claim 1, wherein the rotational speed integrated with respect to time by the first low-pass filter (11) is integrated with respect to time by a second low-pass filter (18), wherein the second low-pass filter (18) has an inverted embodiment with respect to the first low-pass filter (11) and wherein the output value of one of the low-pass filters (11, 18) is subtracted from the output value of the other low-pass filter (11, 18), and wherein the target torque is regulated on the basis of the output values of the second high-pass filter (8) and of the value obtained by the subtraction.

4. The method as claimed in claim 3, wherein a mean value is calculated from the output value of the second low-pass filter (18), wherein the target torque is regulated on the basis of the mean value.

5. The method as claimed in claim 4, wherein the calculated mean value is amplified for the purposes of regulating the target torque.

6. An apparatus (1) for operating an electric machine (2) of a vehicle (3), the apparatus comprising:
   a control device (4) for regulating a target torque of the electric machine (2) during a driving event based on a detected, time-dependent rotational speed of the electric machine (2),
   a first high-pass filter (5) for differentiating the detected rotational speed with respect to time,
   a limiter device (7) for restricting the differentiated rotational speed to only rotational speed values of positive slope gradients,
   a second high-pass filter (8) for differentiating the restricted differentiated rotational speed with respect to time,
   a third high-pass filter (10) for differentiating the detected rotational speed with respect to time, and
   a first low-pass filter (11) for integrating the rotational speed differentiated with respect to time by the third high-pass filter (10) with respect to time,
   wherein the control device (4) regulates the target torque on the basis of an output value of the second high-pass filter (8) and of an output value of the first low-pass filter (11).

7. The apparatus as claimed in claim 6, further comprising a second low-pass filter (18) for integrating the output value of the first low-pass filter (11) with respect to time, wherein the second low-pass filter (18) has an inverted embodiment with respect to the first low-pass filter (11), and by a computing device (19) for subtracting the output value of one of the low-pass filters (11, 18) from the output value of the other low-pass filter (11, 18), wherein the control device regulates the target torque on the basis of the output values of the second high-pass filter (8) and of the output value of the computing device (19).

8. A drive device (24) for a vehicle (3), the drive device (24) comprising:
   an electric machine (2), and
   an apparatus (1) for operating the electric machine (2), the apparatus (1) configured to
   regulate a target torque of the electric machine (2) during a driving event based on a detected, time-dependent rotational speed of the electric machine (2), the apparatus being configured to
   differentiate the detected rotational speed with respect to time by a first high-pass filter (5),
   subsequently restrict the differentiated rotational speed to only rotational speed values of positive slope gradients,
   differentiate the restricted differentiated rotational speed, with respect to time, by a second high-pass filter (8),
   differentiate the detected rotational speed with respect to time by a third high-pass filter (10),
   integrate the rotational speed differentiated by the third high-pass filter (10) with respect to time by a first low-pass filter (11); and
   regulate the target torque based on an output value of the second high-pass filter (8) and an output value of the first low-pass filter (11).

9. A motor vehicle, comprising a drive device (24) as claimed in claim 8.

\* \* \* \* \*